(12) United States Patent
Raynaud

(10) Patent No.: US 6,282,743 B1
(45) Date of Patent: Sep. 4, 2001

(54) MOTOR VEHICLE WIPER COMPRISING A SPRING FOR GENERATING WIPING PRESSURE

(75) Inventor: Richard Raynaud, Champeix (FR)

(73) Assignee: Valeo Systemes d'Essuyage (FR)

( * ) Notice: Subject to any disclaimer, the term of this patent is extended or adjusted under 35 U.S.C. 154(b) by 0 days.

(21) Appl. No.: 09/341,830

(22) Filed: Sep. 13, 1999

(30) Foreign Application Priority Data

Nov. 20, 1997 (FR) .................................................... 97/14696

(51) Int. Cl.⁷ .................................. B60S 1/34; B60S 1/32
(52) U.S. Cl. .................................... 15/250.352; 15/250.34
(58) Field of Search ........................ 15/250.352, 250.351, 15/250.34, 250.31, 250.202

(56) References Cited

U.S. PATENT DOCUMENTS

| | | | |
|---|---|---|---|
| 1,345,541 | * 7/1920 | Gates .................................. | 15/250.34 |
| 2,964,774 | 12/1960 | Bolles et al. ........................ | 15/250.34 |
| 3,344,458 | 10/1967 | Deibel et al. ....................... | 15/250.35 |

FOREIGN PATENT DOCUMENTS

| | | |
|---|---|---|
| 0723898 | 7/1996 | (EP) . |
| 1183874 | 7/1959 | (FR) . |
| 87000 | * 2/1956 | (NO) .................................. 15/250.34 |

* cited by examiner

Primary Examiner—Gary K. Graham
(74) Attorney, Agent, or Firm—J. Gordon Lewis

(57) ABSTRACT

A motor vehicle wiper comprising a driving head designed to be fixed to a free upper end of a wiper driving shaft at a bore includes a wiper arm, which is articulated on the driving head by a rear longitudinal end around a transverse axis which is substantially perpendicular to the general longitudinal direction of the wiper and perpendicular to the driving shaft axis, between a raised position and an operative position toward which it is returned by a helical compression spring inserted between the driving head and a support surface of the arm, the helical compression spring extends around the bore.

10 Claims, 2 Drawing Sheets

MOTOR VEHICLE WIPER COMPRISING A SPRING FOR GENERATING WIPING PRESSURE

BACKGROUND OF THE INVENTION

The invention concerns a motor vehicle windshield wiper comprising a spring for generating wiper pressure. The invention concerns more particularly a motor vehicle wiper comprising a driving head designed to be fixed to a free upper end of the wiper shaft at a bore, and containing a wiper arm which is articulated onto the driving head by a rear longitudinal end, around a transverse axis which is substantially perpendicular to the general longitudinal axis of the wiper and perpendicular to the driving shaft axis, between a raised position and an operative position towards which it is returned by a helical compression spring inserted between the driving head and a support surface of the arm.

In such a wiper, the wiper arm has at its front longitudinal end, a wiper blade equipped with a wiping scraper designed to come into contact with the window to be wiped. The wiping scraper is produced from a supple material and it is, for example, carried by a structure articulated to the blade in a manner that it can hug the curve, as long as it is convex.

In addition, so that the wiping scraper closely hugs the curve of the window, it is necessary that the wiper arm exerts a wiping pressure on the blade in order to press the scraper against the window, the pressure being assured by a wiping pressure spring which pulls the wiper arm towards its operative position.

According to a traditional idea of a wiping pressure spring, this spring is created in a helical tension spring form which is hung by the first end on the arm and by the other end on the driving head along a longitudinal movement line such that, when the arm is near its operative position, the spring pulls the arm in such a manner that the spring presses the scraper against the window, and, in opposition, when the arm is close to its raised position, the spring acts on the arm in order to support it in a means of propping up which defines this raised position.

According to such a conception of a wiper, it is thus necessary to plan that the rear part of the wiper arm be sufficiently large in the transverse direction to be able accommodate the helical tension spring which, in addition, is generally of a relatively long length.

In addition, it had already been proposed in document DE-A-35.08.542, for example, a wiper of which the arm contains a rear part covering the driving head articulated around a transverse axis constructed to the front of the driving head in relation to the driving shaft onto which is mounted the head, and in which a compression screw is constructed to the rear of the driving head in order to cooperate with a supporting surface of the arm which extends above the screw in order to move the arm into rotation around its articulated axis on the driving head towards the operative position.

Such an arrangement notably presents the inconvenience of extending, in an significant manner, the driving head towards the rear, that is to say, to the opposite of the really useful part of the wiper. This is so much more cumbersome that it is necessary to take into account the fact that this longitudinal offshoot towards the rear possesses an angular clearance in rotation around the axis of the driving shaft equal to that of the wiper, which makes it necessary to plan a corresponding clearance space.

The object of the invention is to propose a new conception or means of imposing a wiping pressure to the wiper blade, these means allowing the conception of the most compact wiper possible.

In addition, the object of this invention is to propose, in the frame of a wiper containing a wiping pressure spring which works by compression, means which allow keeping the wiper arm in a raised position, especially in order to facilitate the act of replacing the wiper blade.

SUMMARY OF THE INVENTION

In this goal, the invention proposes a wiper of the type previously described characterized by a helical compression spring extending around the bore.

According to the characteristics of the invention:

- the spring extends at least in part around a cylindrical block from the head in which is constructed a bore designed to receive the upper end of the driving shaft;
- the wiping surface of the arm is an annular surface which is laid out above the driving shaft, which is turned towards the back end against which presses the upper end of the spring;
- the lower end of the spring is supported against a support surface of the driving head;
- the support surface of the head is formed at the bottom of an annular groove;
- the wiper includes means of locking the arm in a raised position;
- the wiper includes a locking lever which is mobile in relation to the head, and which is attracted by elastic means in a cooperative manner, while the arm is in a raised position, with a surface complimentary to the arm in order to keep the arm in a raised position;
- the elastic means comprise the compression spring which is supported by a lower end on a surface by action of the lever which is placed between the lower end of the spring and the support surface of the head;
- the surface of the locking lever's action is formed on an annular ring which rests against a support surface of the driving head and which has an axis considerably parallel to that of the driving shaft while the lever is in a resting position, and the lever contains a locking tab which reaches towards the top from the ring from the rear side in relation to the driving head, and is of such a type that a free end of the tab, forming an indentation, is susceptible to be engaged in a housing complimentary to the arm while the arm is in a raised position; and
- while the arm is led from its operative position towards its raised position, the free end of the lever tab slides along the length of an inclined section of the arm which provokes the swinging of the lever in such a way to compress the compression spring.

BRIEF DESCRIPTION OF THE DRAWING

Other characteristics and advantages of the invention will appear in the reading of the detailed description which follows and for the comprehension of which one will refer to the attached drawings in which.

DESCRIPTION OF THE PREFERRED EMBODIMENTS

Figure 1:
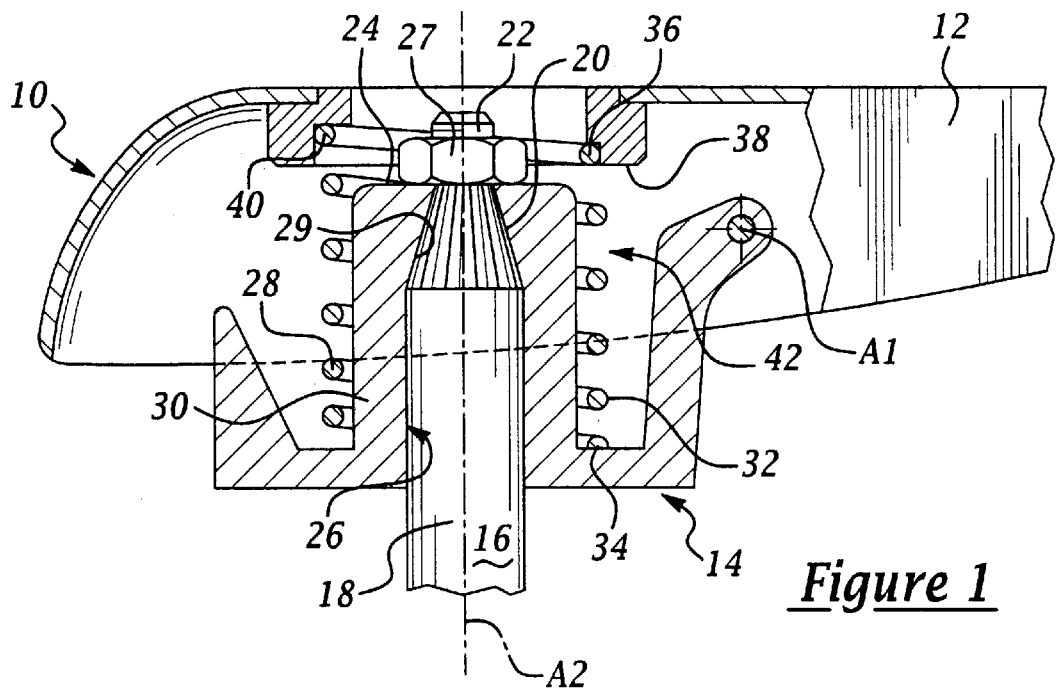
FIGS. 1 and 2 are partial views cut longitudinally of a rear part of a first method of production of a wiper conforming to the description of the invention, the arm being represented, respectively, in an operative position and a raised position.
Figure 2:
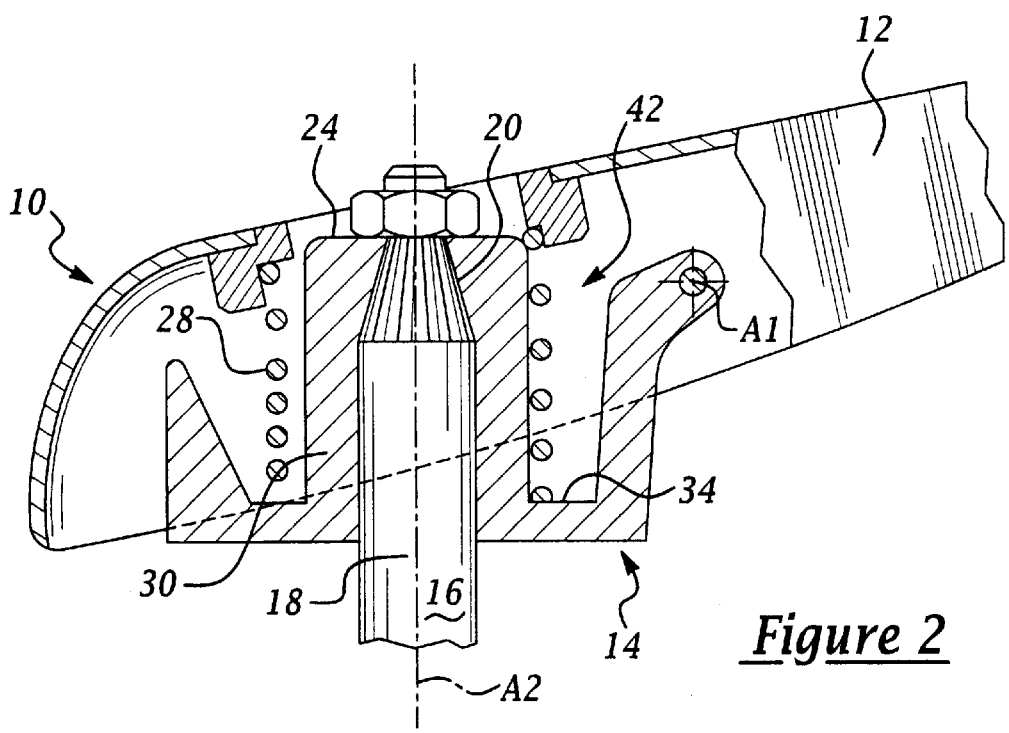

Represented in FIGS. 1 and 2, the rear longitudinal end 10 of a wiper arm 12 of which the front longitudinal end (not represented) is, for example, designed to carry a wiper blade.

In a known manner, the rear end 10 of the arm 12 is shown articulated around a transverse axis A1 on a driving head 14. The driving head 14 is mounted in a fixed manner on the upper end 16 of a driving shaft 18 of the axis A2 which is represented in a vertical position in FIGS. 1 and 2, and which is notably perpendicular to a window to be wiped (not represented.)

The upper end 16 of the shaft 18 has a section shaped like a truncated cone 20 of the axis A2 which narrows towards the top and into which a cylindrical section 22 is threaded lengthwise.

The driving head 14 consists of a bore 26 into which is engaged the upper end 16 of the shaft 18. The bore 26 extending along the axis A2 unblocks the two axial ends and is of a complimentary form to that of the upper end of the shaft 18 in such a way that the threaded section 22 of the shaft 18 reaches above an upper side 24 of the driving head 14. In a known manner, a nut 27 is screwed onto the threaded section 22 pressing against the upper face 24 in order to move the driving head 14 towards the bottom in relation to the shaft 18 and to lead while supporting a bore part 26 shaped like a truncated cone 29 identical with the section shaped like a truncated cone 20 of the shaft 18 to immobilize the driving head 14 in relation to the shaft 18.

In addition, the section shaped like a truncated cone 20 of the shaft 18 can be fluted in a manner to immobilize the driving head 14 in rotation around the axis A2 in relation to the shaft 18.

The shaft 18 is driven into rotation around its axis A2 by a driving mechanism of the wiper (not represented) which imposes a rotating sweeping motion alternating around the axis A2 to a group of elements comprising the shaft 18, the driving head 14 and the arm 12.

In a known manner, thanks to its articulation onto the driving head 14, the blade 12 can be moved from an operative position, illustrated in FIG. 1 and into which it reaches notably and longitudinally perpendicular to the axis A2 in order to press the wiper blade against the window to be wiped, to a raised position illustrated in FIG. 2 and into which the front part of the arm 12 is lifted towards the top, in order to move the front longitudinal end of the arm 12 away from the window.

As one can see in the drawing, the transverse axis of articulation of the arm 12 is constructed longitudinally towards the front of the driving head 14 in relation to the axis A2 from the driving shaft 18 and from the bore 26. In addition, while the arm 12 is lifted towards its raised position, the rear longitudinal end 10 of the arm 12, which entirely covers the driving head 14, tends to descend, that is to say, to near the driving head 14.

In accordance with the details of the invention, the wiping pressure, that is to say, the force exerted by the arm 12 onto the blade, in order to efficiently clean the window, is exerted by a helical compression spring 28 which is constructed in order to be, at least while the arm 12 is in the operative position, notably coaxial to the shaft 18 around the upper end 16 of the shaft 18.

As one can see in the drawing, the spring 28 reaches, on a majority of its length, around a cylindrical block 30 of the axis A2 of the head 14 in which is constructed the bore 26 and which is limited towards the top by the upper surface 24 of the head. The spring 28 is pressed by its lower end 32 against a support surface 34 of the driving head 14 and, by its upper end 36, against a support surface 40 constructed onto the arm 12 above the upper end 16 of the shaft 18.

The support surface 34 of the driving head 14 is an annular surface perpendicular to the axis A2 which stretches around the base of the cylindrical block 30. In the illustrated example of production of the wiper arm 12, the annular support surface 34 of the head 14 forms the bottom of an annular groove 42 of the head 14 which surrounds the block 30. The groove 42 is open towards the top.

Thus, the compression spring 28, by its action, tends to make the arm 12 pivot around the axis A1, in a clockwise direction in the drawing, which allows the arm 12 to impose the necessary force to wipe the window.

When the arm 12 is brought towards its raised position, its rear end 10 nears the driving head 14, which augments the compression of the spring 28, such that the spring 28 exerts enough pressure to return the arm 12 from its raised position to its operative position.

As one can see more clearly in FIG. 1, the support surface 40 of the arm 12, against which the upper end 36 of the spring 28 rests, is constructed in an annular flange 38 which is attached to the arm 12 and which keeps the upper end 36 of the spring 28 radially fixed in relation to the axis A2. The flange 38 can be created as part of the arm 12 or, as it is illustrated in FIG. 1, as an attached piece.

Thus, even though the spring 28 is subjected to a certain radial deflection while the arm 12 is moved towards the raised position, the upper end 36 can not slip and escape the support surface 40. Of course, the lower end 32 of the spring 28 is radially immobilized by the cylindrical block 30.

Thanks to the arrangement of the spring 28 according to the invention, the spring 28 finds itself strongly limited in movement between the driving head 14, such that the rear end 10 of the arm 12 can be of reduced dimensions, notably in the longitudinal direction, and, more specifically, to the rear of the axis A2 of the driving shaft 18 and the bore 26. In addition, this arrangement of the spring 28 allows obtaining an angular course of the arm 12 to be relatively significant between the operative and raised positions.

In addition, the cylindrical block 30 forms a perfect means of guiding the spring 30 which notably avoids all buckling problems of the spring 28.

Figure 3:
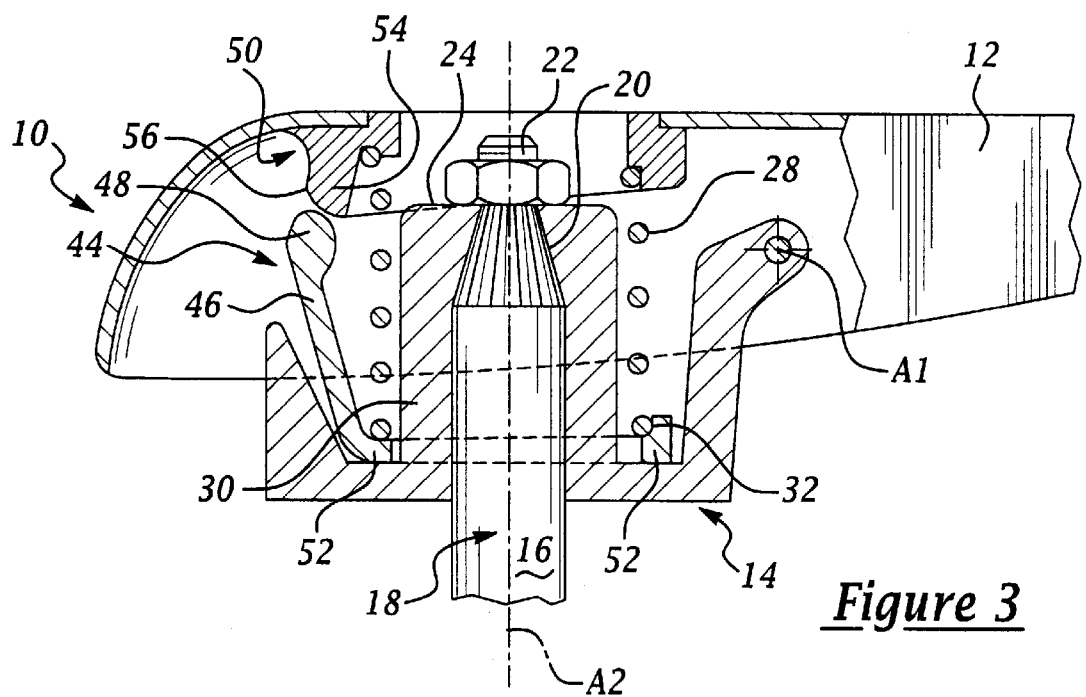
FIGS. 3 and 4 are similar views to those of FIGS. 1 and 2 and illustrate a wiper comprising an advanced means of locking in the raised position.
Figure 4:
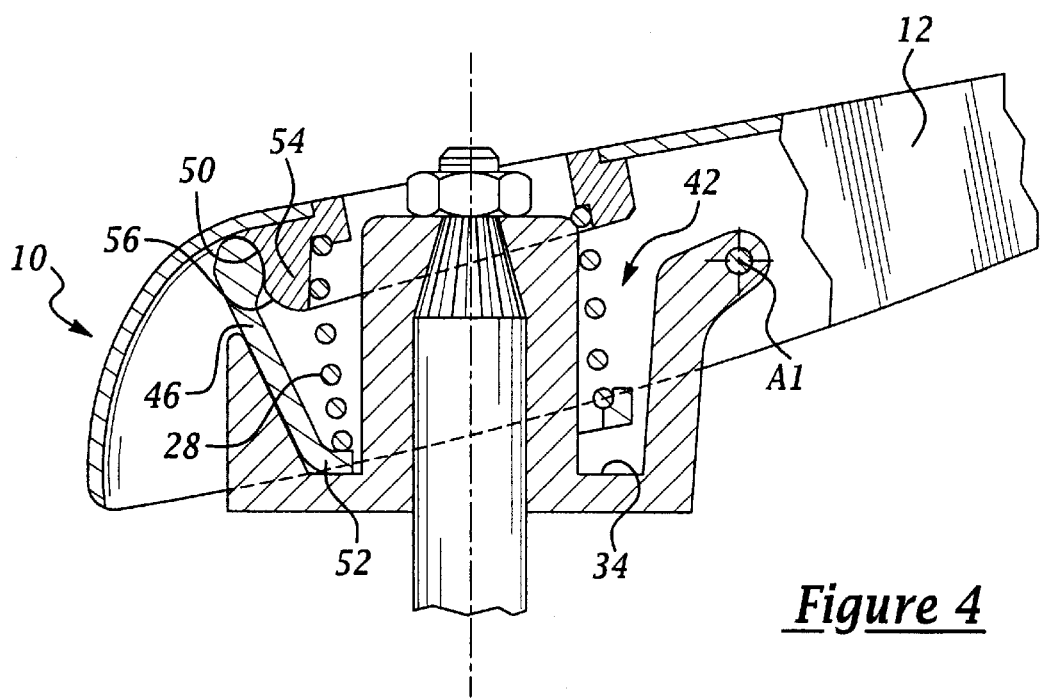

Another objective of the invention is to propose a means to keep the arm 12 in a raised position in order to facilitate replacing the wiper blade. An example of a wiper containing such means is illustrated in FIGS. 3 and 4 in which the elements are identical or similar to those is FIGS. 1 and 2 are designated by the same reference numbers.

As one can see in this production example, it is planned that a locking lever 44 is equipped with a locking tab 46 of which a free end 48 is designed to cooperate with a housing 50 in a complimentary form created in the arm 12 in order to keep the arm in a raised position.

The arm 12, the driving head 14, and the shaft 18 are identical to those described in the first production method in FIGS. 1 and 2.

The lever 44 contains an annular ring 52 which is supported at the bottom of the groove 42, against the support surface 34, and which is constructed such that the lower end 32 of the spring 28 is supported against an upper side of the annular ring 52. When the arm 12 is in an operative position, the ring 52 is pressed against the support surface 34 and its axis is merged with that of the shaft 18.

The tab 46 extends towards the top from the ring 52 from the rear side of the driving head 14 and is slightly inclined towards the rear. The end 48 of the tab 46 forms an offshoot which is radially steered towards the axis A2 of the shaft 18 and towards the front of the driving head 14.

The flange 38 of the arm 12, in which the support surface 40 for the upper end 36 of the spring 28 is formed, is equipped to correspond with the tab 46. A mouthpiece 54 which presents an inclined section 56 is turned towards the bottom and the rear of the arm and is constructed in the form of a recess. The housing 50 into which the free end 48 of the tab 46 is designed to be received is open towards the rear.

While the arm 12 is moved towards its raised position, the inclined section 56 is designed to come into contact with the free end 48 of the tab 46 and, as it is effectively turned towards the rear, the arm 12 tends to provoke a lowering of the lever 44 around a transversal axis passing by a junction zone linking the tab 46 to the ring 52.

The lowering of the lever 44 in an anticlockwise direction in the drawing, tends to provoke a supplementary compression of the spring 28. Thus, the compression spring 28 not only assures the wiping pressure of the wiper, but also the return of the lever 44 towards its resting position illustrated in FIG. 1.

The lowering angle of the lever 44 increases such that the free end 48 of the tab 46 does not pass the upper end of the inclined section 56. Once the free end 48 passes the mouthpiece 54, the compression spring 28, by its action on the ring 52, tends to force the free end 48 to the interior recess 50 constructed above the mouthpiece 54.

Thus, as one can see in FIG. 4, the complimentary forms of the free end 48 and the housing 50 assure, in an automatic manner, blocking of the arm 12 in a raised position. Preferably, these complimentary forms are planned to allow the free end 48 to free itself from the housing 50 when the user applies sufficient pressure to the arm 12 in the direction of returning it to its operative position.

The conception of the means of locking the arm in a raised position presented here is advantageous because it is of reduced bulk and it uses, as a means of returning the lever 44 to a resting position, the compression spring 28 used to supply the pressure force to the blade 12.

What is claimed is:

1. In a motor vehicle wiper including a driving head adapted to be fixed to a free upper end of a wiper driving shaft at a bore, a wiper arm articulated on the driving head by a rear longitudinal end around a transverse axis, which is substantially perpendicular to the general longitudinal direction of the wiper and perpendicular to the driving shaft axis, between a raised position and an operative position towards which it is returned by a helical compression spring inserted between the driving head and a support surface of the arm, the improvement comprising:

the helical compression spring extending around the bore.

2. The improvement of claim 1 comprising:

the spring extending at least partially around a cylindrical block of the head in which is disposed the bore adapted to receive the upper end of the driving shaft.

3. The improvement of claim 1 comprising:

the support surface of the arm being an annular surface attached thereto above the driving shaft, the support surface turned downwardly and against which rests an upper end of the spring.

4. The improvement of claim 1 comprising:

a lower end of the spring resting against a support surface of the driving head.

5. The improvement of claim 4 comprising:

the head support surface being formed at the bottom of an annular groove.

6. The improvement of claim 1 comprising:

means for locking the arm in a raised position.

7. The improvement of claim 6 wherein the locking means comprises a locking lever mobile in relation to the head and moved by elastic means cooperating, when the arm is in a raised position, with a surface complimentary to the arm in order to keep the arm in a raised position.

8. The improvement of claim 7 wherein:

the elastic means includes the compression spring supported by a lower end of an action surface of the lever interposed between the lower end of the spring and the support surface of the head.

9. The improvement of claim 8 comprising:

the action surface of the locking lever formed on an annular ring, which rests against the driving head support surface and has an axis parallel to the axis of the driving shaft when the lever is in a resting position; and the lever including a locking tab extending upwardly when the ring, from the rear side in relation to the driving head, is susceptible to be engaged in a complimentary housing of the arm when the arm is in a raised position.

10. The improvement of claim 9 wherein:

when the arm moves from the operative position towards the raised position, the free end of the tab sliding along an inclined section of the arm provokes the lowering of the lever to compress the compression spring.

* * * * *